US011714721B2

(12) United States Patent
Ehsan et al.

(10) Patent No.: US 11,714,721 B2
(45) Date of Patent: Aug. 1, 2023

(54) MACHINE LEARNING SYSTEMS FOR ETL DATA STREAMS

(71) Applicant: Bank of America Corporation, Charlotte, NC (US)

(72) Inventors: Aqa Muhammad Ziaul Ehsan, Plano, TX (US); Kevin Luong Tran, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 212 days.

(21) Appl. No.: 17/243,946

(22) Filed: Apr. 29, 2021

(65) Prior Publication Data
US 2022/0350704 A1 Nov. 3, 2022

(51) Int. Cl.
*G06F 11/00* (2006.01)
*G06F 11/14* (2006.01)
*G06F 16/25* (2019.01)
*G06F 16/215* (2019.01)
*G06N 20/00* (2019.01)
(Continued)

(52) U.S. Cl.
CPC .......... *G06F 11/142* (2013.01); *G06F 9/5016* (2013.01); *G06F 11/3452* (2013.01); *G06F 11/3476* (2013.01); *G06F 16/215* (2019.01); *G06F 16/254* (2019.01); *G06N 20/00* (2019.01)

(58) Field of Classification Search
CPC ............... G06F 11/142; G06F 11/3452; G06F 11/3476; G06F 11/079; G06F 11/0793; G06F 11/3034; G06F 11/3041; G06F 11/3447; G06F 11/3409; G06F 16/215; G06F 16/254; G06F 9/5016; G06N 20/00
See application file for complete search history.

(56) References Cited

U.S. PATENT DOCUMENTS 10,509,696 B1 * 12/2019 Gilderman .......... G06F 11/0727
2022/0222266 A1 * 7/2022 Makumbi ............. G06F 16/254
(Continued)

OTHER PUBLICATIONS

"Process Real-Time IoT Data Streams with Azure Stream Analytics," https://docs.microsoft.com/en-us/azure/stream-analytics/stream-analytics-get-started-with-azure-stream-analytics-to-process-data-from-iot-devices, Nov. 26, 2019.

*Primary Examiner* — Joseph D Manoskey
(74) *Attorney, Agent, or Firm* — Weiss & Arons LLP

(57) ABSTRACT

Apparatus and methods an artificial intelligence method of reducing failure in an informational flow of a data stream controlled by an Extract Transform Load process using a machine learning ("ML") model training system are provided. The method may include deploying a software sensor that periodically captures data points for an extract job executed during an extract phase of the process. The method may also include building a behavior profile concurrently with the receipt of each of the data points. The method may further include comparing the behavior profile to behavior profiles stored in an Adverse Behavior Model database and behavior profiles stored in a Normal Behavior Model database. When the behavior profile is determined to have a threshold number of match points matching the behavior profile to behavior profiles in the Adverse Behavior Model database, the method may include increasing a target database storage capacity.

17 Claims, 8 Drawing Sheets

(51) Int. Cl.
*G06F 11/34* (2006.01)
*G06F 9/50* (2006.01)

(56) References Cited

U.S. PATENT DOCUMENTS

2022/0230024 A1* 7/2022 Kallianpur ............ G06F 18/285
2022/0374442 A1* 11/2022 Kaspa .................... G06F 16/26

* cited by examiner

… (1) …

MACHINE LEARNING SYSTEMS FOR ETL DATA STREAMS

FIELD OF TECHNOLOGY

Aspects of the disclosure relate to providing apparatus and methods for reducing failure in an information flow of a data stream. In particular, the disclosure relates to apparatus and methods for reducing failure in an information flow of an Extract Transform Load ("ETL") data stream.

BACKGROUND

As demand for big data analytics grows in the industry, so does the complexity of moving and transforming data across numerous and varying platforms. In a data warehouse environment, data movement is critical to ensuring availability and accuracy of the data being transferred. As data is moved through complex ETL data streams that potentially span across global data center locations, it has become increasingly difficult to manage the health and quality of the data and effectively react to issues on a timely manner.

Late detection of incidents is expensive to diagnose as well as triage. The cost of rectifying issues after the fact can grow exponentially as the damage may cause undue harm downstream. As such, early detection of issues within any given data stream is important.

There is a need, therefore, for apparatus and methods for monitoring ETL data streams to proactively predict anomalous behavior and remediate the infrastructure prior to system failure.

SUMMARY OF THE DISCLOSURE

Apparatus and methods for using artificial intelligence ("AI") to reduce failure in an informational flow of a data stream controlled by an ETL process are provided. The apparatus and methods may use a machine learning ("ML") model training system. The ETL process may include an extract phase, the extract phase followed by a transform phase and the transform phase followed by a load phase.

The methods may include deploying a software sensor that periodically captures data points for an extract job executed during the extract phase. Each data point may capture a file size of data being extracted from a source database at a time and the time. The methods may include receiving the data points from the software sensor.

The methods may include building a behavior profile concurrently with the receipt of each of the data points. The behavior profile may include a time-based graphical representation the data points.

The methods may include comparing the behavior profile to behavior profiles stored in an Adverse Behavior Model database and behavior profiles stored in a Normal Behavior Model database. The behavior profiles stored in the Adverse Behavior Model may correspond to training extract jobs that extracted, from training source databases, unexpectedly large files.

When the behavior profile is determined to have a threshold number of match points matching the behavior profile to behavior profiles in the Adverse Behavior Model database, the methods may include identifying a target database into which the ETL process loads data during the load phase. The methods may also include instructing the target database to increase a storage capacity of the target database by acquiring additional cloud-based storage resources. These actions may preemptively prevent failure of the data stream at the load stage by increasing the target database's storage capacity.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
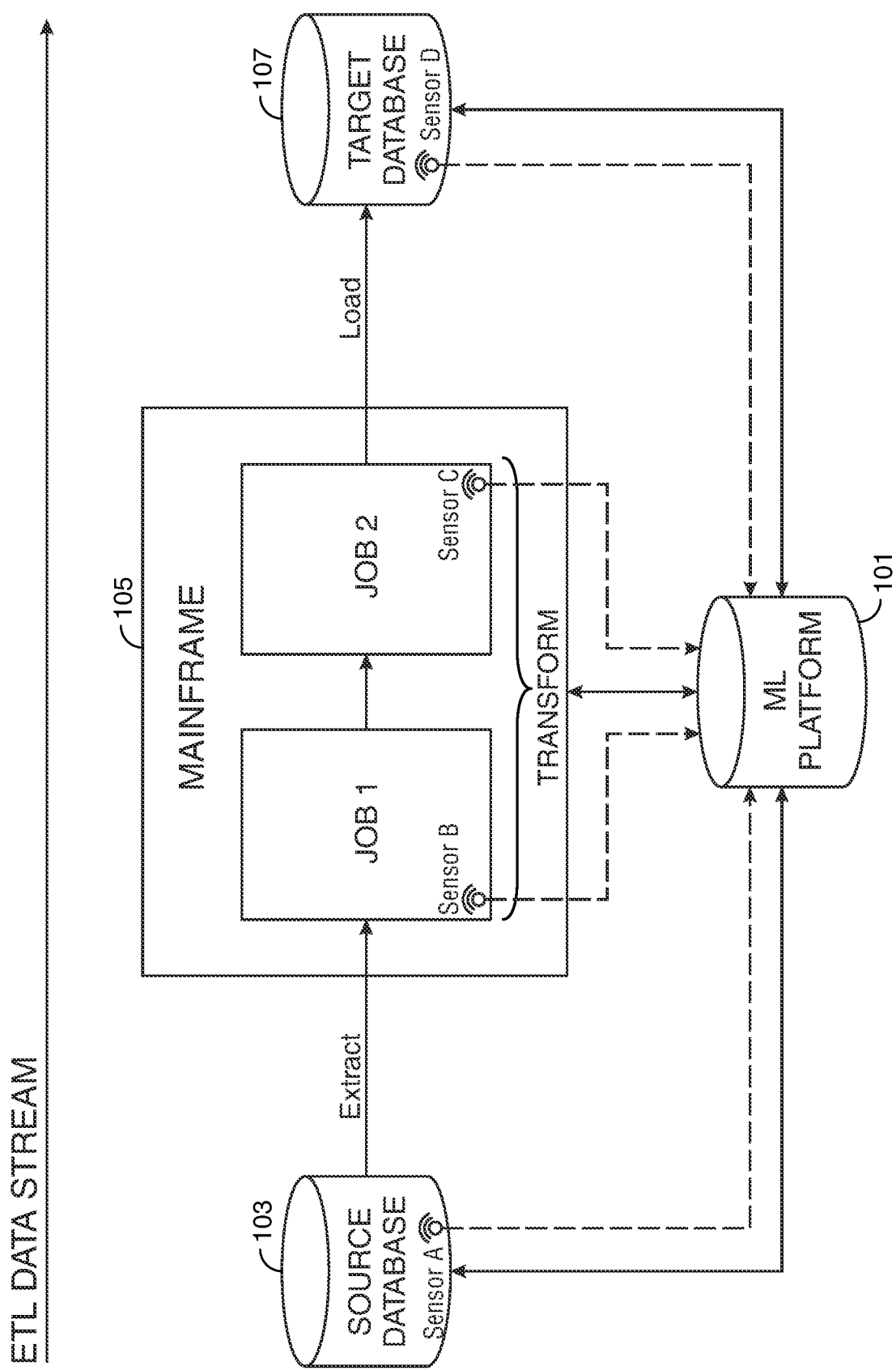
FIG. 1 shows illustrative apparatus and methods in accordance with the invention.

Apparatus and methods for reducing failure in an informational flow of a data stream using an AI system controlled by an ETL process are provided. The AI methods may use a ML model training system. The ETL process may include an extract phase, a transform phase and a load phase. The extract phase may be followed by a transform phase. The transform phase may be followed by a load phase.

The extract phase may include an extract job extracting data from a source database and transferring the data to a mainframe computer system (referred to alternately herein as a "mainframe"). The transform phase may include the mainframe computer system executing one or more transform jobs on the data. The load phase may include a load job loading the data processed by the mainframe computer system from the mainframe computer system to a target database. In some embodiments, the ETL job may include two, three or more extract jobs, transform jobs and/or load jobs.

The AI methods may include deploying a software sensor that periodically captures data points for an extract job executed during the extract phase. Each data point may capture a file size of data being extracted from a source database at a time and the time. A software sensor may be referred to alternately herein as a "sensor."

One, two, three, four or more sensors may be deployed by the AI methods. Each sensor may monitor a characteristic of an extract job, a transform job or a load job. In some embodiments, a sensor may be configured to concurrently monitor two or more characteristics of an extract job, a transform job or a load job.

A sensor may be placed in the source database. A sensor may be placed in the mainframe. A sensor may be placed in the target database.

Exemplary sensors may include a file size sensor, a table size sensor, a Local Area Network ("LAN") speed sensor, a Wide Area Network ("WAN") speed sensor, a Bandwidth sensor, an I/O Exceptions sensor, a RAM sensor, a CPU sensor, a Date/Time completion sensor, and any other suitable sensor.

A file size sensor may measure a size of a file in MB, GB, or any other suitable measurement. A table size sensor may measure a size, used space, and/or free space of a table being populated by the ETL process. A LAN speed sensor may measure a network speed within a geographic location of the ETL process. A WAN speed sensor may measure a network speed of the ETL process without being restricted by geographic location. A bandwidth usage sensor may measure a data transfer rate and a total usage of available bandwidth. Transfer data may be included as part of the total bandwidth usage. An I/O exceptions sensor may detect failure during the reading, writing and/or searching of a file. A RAM usage sensor may measure how much RAM is being used by the monitored step of the ETL job. A CPU sensor may measure CPU cycles to track CPU usage. A Date/Time completion sensor may be executed at a last step of a transform job using events at any of the Extract, Transform, Load stages to predict an expected time and/or date of a completion of the job.

Each of the sensors may transfer the captured data points to a ML platform. The ML platform may perform some or all of the AI methods described herein. The ML platform may include a computing system comprising one or more databases, processors and transmitters. The ML platform may use the data points to create behavior profiles. The behavior profiles may then be compared to stored ML data to determine whether the ETL data stream is likely to fail. The failure may be a downstream failure. If the ETL process is determined likely to fail based on stored historical data and ML models, the ML platform may trigger one or more remedial actions to be performed at the source database, mainframe computer system and/or the target database. The remedial action may preemptively avoid the likely failure prior to an actual failure, thus saving time, resources, and ensuring the timely completion of the ETL process.

The deploying the software sensor may include running a shell script in the source database. The deploying the software sensor may include running a shell script in a mainframe computer system. The deploying the software sensor may include running a shell script in the target database.

When the software sensor is run in the source database, the software sensor may capture attributes of the data being extracted from the source database. When the software sensor is run in the mainframe computer system, the software sensor may capture attributes of data being received by the mainframe, transformed by the mainframe, and/or transmitted to the target database from the mainframe. When the software sensor is run in the target database, the software sensor may capture attributes of data being received by the target database.

The software sensor may capture each data point upon the lapse of a predetermined time. Exemplary time periods may include ever 1 second, 5 seconds, 15 seconds, 30 seconds, 1 minute, 10 minutes, 30 minutes, 1 hour, 2 hours, or any other suitable time. For example, the software sensor may capture a first data point at a first time and a second data point at a second time after the lapse of a predetermined time interval from the first time.

The AI methods may include receiving the data points from the software sensor. The AI methods may include building a behavior profile concurrently with the receipt of each of the data points. For example, after the receipt of a new data point, the behavior profile may be expanded to include the new data point. The behavior profile may include a time-based graphical representation the data point. For example, the X-axis may represent the time elapsed since the start of the ETL process, and the Y-axis may represent a value being measured by the sensor—e.g. size of file in GB. The graphical representation may be an AI model. The graphical representation may be a pattern recognition AI model.

When a single sensor is utilized, the building of the behavior profile may involve developing a behavior profile based on data points collected by the software sensor. When multiple sensors are utilized, the AI methods may include developing a behavior profile for each of the sensors, each behavior profile being based on data points collected by one of the sensors.

Each behavior profile may comprise time-based sensor data representing a behavior of an ETL Stream. The behavior may be a behavior monitored by a software sensor. Data captured by the sensor may be plotted by the ML platform on an X,Y axis to create a graphical presentation of the data stream's behavior pattern during the time that the data points were captured.

The ML platform may compare each behavior profile with one or more stored behavior profiles to determine differences and changes in behaviors of an ETL stream. The stored behavior profile(s) may be stored in a Normal Behavior Model database. The stored behavior profile(s) may be stored in an Adverse Behavior Model database. In some embodiments the stored behavior profile may be a ML normal behavior profile.

In some embodiments, building the behavior profile may be terminated when the job that a sensor is monitoring has been completed by a predetermined amount. For example, when a sensor may stop monitoring an extract job when the extract job has extracted a predetermined percentage of a total number of files from a source database. In exemplary embodiments, when more than 80% of the files have been loaded into a mainframe computer system, the sensor may terminate the monitoring the extract job.

In some embodiments, building the behavior profile may terminate when the extract job is complete.

The AI methods may include creating and storing behavior profiles in the Normal Behavior Model database and the Adverse Behavior Model database during a training period. During the training period, if a training ETL process concludes without any errors or failures, behavior profiles built for the training ETL process by software sensors may be stored in the Normal Behavior Model database. During the training period, if a training ETL process generates an error, captured sensor data that culminated up to the error event (e.g., a data storage breach) may be used to construct a behavior model which is subsequently stored in the Adverse Behavior Model database.

In some embodiments, the ML platform may include a database storing both the Adverse Behavior Model data and the Normal Behavior Model data. In the database, behavior profiles that have been determined to be normal may be tagged as 'normal' in the database. Behavior profiles that have been determined to be adverse may be tagged as 'adverse' in the database. The tags may be any other suitable indicators.

The AI methods may include comparing a new behavior profile being built for an ongoing ETL process to behavior profiles stored in an Adverse Behavior Model database and behavior profiles stored in a Normal Behavior Model database. The comparing may be used to determine whether or not the behavior profile is anomalous and whether or not remedial action should be triggered.

The AI methods may compare each software sensor's associated behavior profile to behavior profiles generated by sensors that tracked the same type of data. For example, a behavior profile plotting WAN speed may be compared to stored behavior profiles that were generated from WAN speed sensors.

In some embodiments, the comparing may include determining if the behavior profile has a pattern similar to a pattern stored in the Adverse Behavior Model database and/or tagged as 'adverse' by the ML platform.

In some embodiments, the comparing may include determining if the behavior profile has a threshold number of match points matching the behavior profile to a behavior profile stored in the Adverse Behavior Model database. The behavior profile may be determined to have the threshold number of match points when one, two, three or more characteristics of the behavior profile are identical to, or substantially similar to, characteristic(s) of a behavior profile stored in the Adverse Behavior Model database. Exemplary characteristics include slope, minimum value, maximum value, average value over a time interval, shape of behavior profile over a time interval, and any other suitable characteristics.

In some embodiments, instead of, or in addition to, the comparing, the AI methods may include identifying, in a ML database built by the ML model training system, a ML normal behavior profile. The ML database may include a plurality of ML normal behavior profiles, each ML normal behavior profile being tagged with a different target database identifier.

The identifying may include identifying a target database into which the ETL process loads its data at the load stage. The identifying may include searching the ML database for a ML normal behavior profile tagged with a target database identifier that identifies the target database into which the ETL process loads its data. For example, if the ETL process for which a behavior profile is currently being built uses DatabaseX as its target database, the AI methods may include searching the ML database for a ML normal behavior profile tagged with an identifier that identifies 'DatabaseX.'

The AI methods may include extracting the ML normal behavior profile tagged with the required target database identifier.

The AI methods may be triggered to perform remedial action when the behavior profile is determined to be adverse. The remedial action may be performed in one or more of the source database, mainframe computer system and the target database. The AI methods may include instructing the appropriate systems to execute the remedial action prior to the generation of an error message, thus preemptively avoiding failure of the ETL process.

In some embodiments, the behavior profile may be determined to be adverse when the behavior profile is determined to have a threshold number of match points matching the behavior profile to a behavior profile in the Adverse Behavior Model database after the comparing.

For example, when the behavior profile is created by data points generated from a sensor monitoring an extract job, the behavior profiles stored in the Adverse Behavior Model database and used for the comparison may correspond to extract jobs that extracted data, from source databases, in ETL processes that generated one or more failure messages. In some of these embodiments, the match points may be identified by the AI methods, during an ML training phase, as characteristics of a behavior profile of a training ETL process that extracted, during the extract phase, an unexpectedly large volume of data.

In some embodiments, the behavior profile may be determined to be adverse when the behavior profile includes a characteristic deviating from a ML normal behavior profile characteristic by more than a predetermined amount. Exemplary characteristics of a behavior profile may include a minimum value, a maximum value, a rate of decrease, a rate of increase, or any other suitable characteristic.

For example, the behavior profile may be determined to be adverse when a characteristic of the behavior profile differs from a characteristic of the ML normal behavior profile by more than a predetermined deviation amount. For example, a ML normal behavior profile may map incoming data size as no greater than 20 GB. If the behavior profile includes data point(s) greater than 20 GB by more than a predetermined deviation amount, the remedial action may be triggered. The predetermined deviation amount may be 2 GB, 3 GB, or any other suitable value.

In some embodiments, classifying the behavior profile as adverse may be sufficient to execute the remedial action. In some embodiments, two or more behavior profiles, each being built by a different sensor deployed for the ETL process, must be classified as adverse for the remedial action to be triggered.

In exemplary embodiments, when a behavior profile of one, two, three, or all of a file size sensor, table size sensor, bandwidth sensor and a RAM sensor are determined to be adverse as described herein, the AI methods may determine that a storage breach is imminent. Exemplary remedial action may include instructing a target database to increase storage capabilities as described herein, free up disc space in one of the databases by running an archive script, and any other suitable remedial action.

In exemplary embodiments, when a behavior profile of one, two, three, or all of a WAN speed sensor, LAN speed sensor, I/O Exceptions sensor and a Date/Time Completion sensor are determined to be adverse as described herein, the AI methods may determine that the ETL process is exhibiting Data Latency, and that the ETL data stream will arrive later than expected to the target database. Exemplary remedial action may include pausing and/or delaying the scheduling of one or more load jobs and/or one or more transform jobs and any other suitable remedial action.

In exemplary embodiments, when a behavior profile of one, two or all of a I/O Exceptions sensor, CPU sensor and/or Date/Time Completion sensor are determined to be adverse as described herein, the AI methods may determine that a quality of the data in the ETL process data stream has been downgraded. Exemplary remedial actions may include terminating the ETL process, restarting a job included in the ETL process, retrying a file read/write function, adding an additional transform job at the mainframe computer system to remediate the downgrade, and any other suitable remedial action.

When the behavior profile is determined to be adverse, the AI methods may include adding the behavior profile to the Adverse Behavior Model database. This may ensure the continuous strengthening of the ML databases by augmenting the training data with updated information.

When the behavior profile is determined to be adverse, the AI methods may include identifying a target database into which the ETL process loads data during the load phase. The AI methods may include instructing the target database to increase a storage capacity of the target database. The instructing may be executed prior to a failure of the ETL process at the load phase.

The storage capacity may be increased by acquiring additional cloud-based storage resources. This may preemptively prevent failure of the data stream at the load stage by increasing the target database's storage capacity.

In some embodiments, prior to instructing the database to increase storage capacity, the AI methods may determine whether or not the storage capacity of the target database may be exceeded based on the behavior profile. For example, the AI methods may include extrapolating a total file size of data in the ETL data stream that will be loaded in the target database, and, when the total file size is determined to exceed an available storage capacity of the target database, triggering the instructing of the target database.

In exemplary embodiments, the extrapolation may include accessing current target database storage capacity and an estimated size of data that will be loaded into the target database. The extrapolation may include extrapolating, based on a current volume of data extracted from the source database, a final size of extracted data, retrieving jobs scheduled to transform the data in the mainframe computer system and the effect of the jobs on the size of the data, retrieving a storage capacity of the target database and comparing the storage capacity to the size of data expected to be loaded from the mainframe computer system.

For example, if 50 gigabytes were extracted so far by the extract job and the extract job is 50% complete, the AI methods may include estimating that 100 gigabytes will be extracted. The AI methods may then determine that there is one transform job executed during the transform phase and that it increases the size of the data by a factor of 2. Thus, the data will then be estimated to be 200 gigabytes after the execution of the transform job. In the event that the size of target database is determined to be 150 gigabytes and the data coming from the mainframe computer is expected to be 200 gigabytes, the AI methods may instruct the target database to increase its storage capacity by 100% of the estimated deficit (here, 50 gigabytes), or any other percentage of the estimated deficit, such as 110%, 120%, etc. to allow for additional increases in either the ETL data stream or the databases' own storage needs.

In some embodiments, the AI methods may not determine a storage capacity of the target database. Instead, the AI methods may learn the storage capabilities of the target database through successful ETL runs. Specifically, for each successful run, a "Normal" behavior profile may be created and/or enhanced using the sensor data generated during the successful run. For each run where the ETL fails because the target database storage was breached, the associated behavior profile may be used as an "adverse" model. Through this continuous learning the system may automatically learn the target database's capabilities, including lower and upper limits of data storage, without knowing the target database's data storage capacity.

When the behavior profile is determined to be adverse, the AI methods may include issuing instructions to a mainframe computer system. The mainframe computer system may execute a first transform job during the transform phase. The instructions may include instructing the mainframe computer system to generate a second transform job to run in the transform phase. The second transform job may execute a script identical to the first transform job. The second transform job may be different from the first transform job.

The issuing instructions may include instructing to the mainframe computer to split the data received from the extract job into a first transform data stream and a second transform data stream streams and to process, in parallel, the first transform data stream using the first transform job and the second transform data stream using the second transform job. This may increase the capabilities of the mainframe computer system to quickly process data being extracted from the source database by the ETL process, thereby preemptively preventing failure of the ETL process at the transform phase. This may additionally speed up the processing of the ETL process and ensure that the transform jobs will be timely executed. This remedial action may be used when the AI methods determine that a storage breach imminent and/or that the ETL data stream will arrive later than expected to the target database.

The AI methods may include initiating a ML phase. The ML phase may be executed during a training period. The ML phase may include loading training behavior profiles into an Adverse Behavior Model database and a Normal Behavior Model database. The ML phase may include any of the sensors described herein. The sensors may be placed at any of the source database, mainframe computer system and the target database. For purposes of illustration the ML phase will be described as occurring during the extract phase, however it is to be understood that the ML phase may occur using any sensor data from any location.

In some embodiments, each of the training behavior profiles may be generated for one of a plurality of training ETL processes during an extract phase of a training ETL process.

The ML phase may include deploying the software sensor. The software sensor may periodically capture training data points for each of the plurality of training ETL processes. Each training data point may store a file size of data being extracted, by the training ETL process, from the source database at a time and the time.

The ML phase may include receiving the training data points from the software sensor. For each of the plurality of training ETL processes, the ML phase may include creating a training behavior profile. The training behavior profile be the behavior profile as described herein, generated during the training phase. The training behavior profile may include a graphical representation the training data points generated by the software sensor during the training ETL process.

During the ML phase, upon completion of a training ETL process, the AI methods may include determining if the training ETL process generated one or more failure messages during one or more of the extra phase, transform phase and load phase.

For each training ETL process that generated one or more failure messages, the AI methods may include saving a corresponding training behavior profile in the Adverse Behavior Model database. The AI methods may also include tagging the training behavior profile with an identifier identifying a target database into which the training ETL process loads data at the load phase.

For each ETL process that did not generate a failure message, the AI methods may include saving a corresponding training behavior profile in the Normal Behavior Model database. The AI methods may also include tagging the training behavior profile with an identifier identifying a target database into which the training ETL process loads data at the load phase.

The failure messages may be failure messages generated during the transform phase and the load phase of the training ETL processes. The failure message may be a failure message generated during the extract phase. The failure message may be a failure message generated during the transform phase. The failure message may be a failure message generated during the load phase.

The AI methods may also include grouping the training behavior profiles in the Normal Behavior Model database into groups. Each group may include training behavior profiles associated with one of the identifiers. For each group, a ML normal behavior profile may be built. Each built ML normal behavior profile may be tagged with the identifier associated with the group.

A ML normal behavior profile may represent, for each point in time, an average data point, the average data point being created by averaging all data points in time from the group. A ML normal behavior profile may represent an average behavior profile, the average behavior profile being built by averaging, for each point in time, the data points of the training behavior profiles registered for the point in time.

The ML phase described above may be performed for data received from a single type of sensor monitoring training ETL processes. For example, the ML phase may be performed for a sensor monitoring a file size of files being extracted from the source database during the extract phase.

The AI methods may include performing the ML phase described above for two or more sensors. In these embodiments, the data received from each sensor may be separately saved and grouped, and a ML normal behavior profile may be built for each sensor. For example, a first ML normal behavior profile may be built for a file size sensor monitoring data being extracted during the extract phase, a second ML normal behavior profile may be built for a file size sensor monitoring data being loaded into a target database, a third ML normal behavior profile may be built for a file size sensor monitoring data being transformed in the transform phase, a fourth ML normal behavior profile may be built for a LAN speed sensor, and any other additional ML normal behavior profiles may be built for one or more of the additional sensors described herein.

For the purposes of the invention, a point in time, or a 'time,' may represent how much time has lapsed since an ETL process began running. As such, '0' time may represent a point in time immediately prior to the ETL process being launched. 10 sections may represent 10 seconds into the running of the ETL process.

The AI methods may include initiating a ML phase. The ML phase may be executed during a training period. The ML phase may include loading training behavior profiles into the Adverse Behavior Model database and the Normal Behavior Model database. Each training behavior profile may be generated for one of a plurality of training jobs.

Each of the plurality of training jobs may be deployed during an extract phase of a training ETL process. Each of the plurality of training jobs may be deployed during a transform phase of a training ETL process. Each of the plurality of training jobs may be deployed during a load phase of a training ETL process.

The ML phase may include deploying the software sensor. The software sensor may periodically capture training data points for each of the plurality of training jobs. The software sensor may be any software sensor described herein. For illustrative purposes, the software sensor is described below as a file size software sensor, however it is to be understood that any sensor deployed at any point during the ETL process may be used.

In the illustrative embodiment, each training data point may capture a file size of data being extracted from the source database at a time and the time. In some embodiments, multiple software sensors may be used to capture training data points for a plurality of training jobs.

The ML phase may include receiving the training data points from the software sensor. For each of the plurality of training jobs, the ML phase may include creating a training behavior profile. The training behavior profile may include a graphical representation the training data points generated by the software sensor for the training job. Upon completion of an ETL process associated with each training job, the ML phase may include determining if the ETL process generated one or more failure messages.

For each ETL process that generated one or more failure messages, the ML phase may include saving a corresponding training behavior profile in the Adverse Behavior Model database. For each ETL process that did not generate a failure message, the ML phase may include saving a corresponding training behavior profile in the Normal Behavior Model database.

The failure message may be a failure message generated during any of the extract, transform and load stages of the training ETL processes. The failure message may be a failure message generated during the transform phase and/or the load stage of the training ETL processes.

The AI methods may include deploying a plurality of sensors, as described above. In exemplary embodiments, the AI methods may include a first software sensor that periodically captures first data points, a second software sensor that periodically captures second data points, and a third software sensor that periodically captures third data points.

The first, second and third sensors are described below as capturing data from an extract job. However, it is to be understood that the AI methods may use any suitable type of sensors as described herein, and that each of the sensors may capture data from an extract job, a transform job and/or a load job.

In some embodiments, the deploying the first software sensor may include running a first shell script together with the extract job. The deploying the second software sensor may include running a second shell script together with the extract job. The deploying the third software sensor may include running a third shell script together with the extract job.

In some embodiments, the deploying the first software sensor, the second software sensor and the third sensor may include running a first shell script, a second shell script and a third shell script in a mainframe computer system.

In exemplary embodiments, the first sensor may capture first data points for an extract job. Each first data point may capture a file size of data being extracted from a source database by the extract job at a time and the time. The second software sensor may periodically capture second data points for the extract job. Each second data point may capture a table size of the files being extracted from the source database at a time and the time. The third software sensor may periodically capture third data points for the extract job. Each third data point may capture a bandwidth of a data connection between the source database and a mainframe computer system at a time and the time. In alternative embodiments, the first, second and third sensors may be any other type of sensor described herein.

The AI methods may include receiving the first data points, the second data points and the third data points from the software sensor. The AI methods may include building a first behavior profile concurrently with the receipt of each of the first data points, building a second behavior profile concurrently with the receipt of the second data points, and building a third behavior profile concurrently with the receipt of the third data points.

In some embodiments, the building of the behavior profiles may be terminated when the extract job has completed extracting a predetermined percentage of a total number of files which the extract job is programmed to extract. In some embodiments, the building of the behavior profiles may be terminated when the extract job is complete.

In some embodiments, the AI methods may include determining if the first behavior profile, the second behavior profile and the third profile are adverse using one or more of the processes described herein.

For example, the AI methods may include comparing the first behavior profile to first behavior profiles stored in an Adverse Behavior Model database and first behavior profiles stored in a Normal Behavior Model database. The AI methods may include comparing the second behavior profile to second behavior profiles stored in the Adverse Behavior Model database and second behavior profile stored in the Normal Behavior Model database. The AI methods may include comparing the third behavior profile to third behavior profiles stored in the Adverse Behavior Model database and third behavior profiles stored in the Normal Behavior Model database.

In the event that at least two of the first behavior profile, second behavior profile and third behavior profile are determined to be adverse, the AI methods may include identifying a target database into which the ETL process loads data during the load phase. The AI methods may also include, in some embodiments, instructing the target database to increase a storage capacity of the target database by acquiring additional cloud-based storage resources. This may preemptively prevent failure of the data stream at the load stage by increasing the target database's storage capacity.

The first, second and third behavior profile may be determined to be adverse when the respective behavior profile has a threshold number of match points matching to a profile stored in the Adverse Behavior Model database.

The first, second and third behavior profile may be determined to be adverse when the respective behavior profile includes a characteristic deviating from a ML normal behavior profile characteristic by more than a predetermined amount. The first behavior profile may be compared to a first ML normal behavior profile. The second behavior profile may be compared to a second ML normal behavior profile. The third behavior profile may be compared to at third ML normal behavior profile.

In some embodiments, when two of the first behavior profile, second behavior profile and third behavior profile are determined to be adverse, the AI methods may include adding the first behavior profile, the second behavior profile and the third behavior profile to the Adverse Behavior Model database.

In some embodiments, only the behavior profiles determined to be adverse may be added to the Adverse Behavior Model database.

A behavior profile not determined to be adverse may be added to the Normal Behavior Model database.

The apparatus and methods may include apparatus for leveraging AI to reduce failure in an informational flow of a data stream controlled by the ETL process. The AI may use the ML training system.

The apparatus may include the source database for storing a plurality of files. The apparatus may include the ML platform. The apparatus may include the mainframe computer system. The apparatus may include the target database. The apparatus may be configured to execute one or more of the methods described herein.

The ML platform may be configured to deploy a software sensor in the source database. The software sensor may periodically capture data points for an extract job, a transform job or a load job. For illustrative purposes, the software sensor is described as capturing data from an extract job executed during the extract phase. However, it is to be understood that the software sensor may be any software sensor described herein, and the apparatus and methods described herein, may apply to data captured from any phase of the ETL data stream.

When the software sensor captures data from the extract job during the extract phase, each data point may capture a file size of data being extracted from the source database at a time and the time.

The ML platform may further be configured to receive the data points from the software sensor and build a behavior profile concurrently with the receipt of each of the data points. The behavior profile may include a time-based graphical representation the data points.

The ML platform may also be configured to determine if the behavior profile is adverse using any of the processes described herein. For example, the ML platform may compare the behavior profile to behavior profiles stored in an Adverse Behavior Model database and behavior profiles stored in a Normal Behavior Model database. The behavior profiles stored in the Adverse Behavior Model may correspond to training extract jobs that extracted, from training source databases, unexpectedly large files.

The ML platform may additionally, or alternately, compare the behavior profile to a ML normal behavior profile.

When the behavior profile is determined to be adverse, the ML platform may be further configured to identify a target database into which the ETL process loads data during the load phase. The ML platform may be further configured to instruct the target database to increase a storage capacity of the target database. The increase may be affected by the target database acquiring additional cloud-based storage resources. This may preemptively prevent failure of the data stream at the load stage by increasing the target database's storage capacity. In some embodiments, instead of instructing the target database to increase its storage capacity, the ML platform may proactively instruct a cloud-based data storage system to add additional data storage to target database.

The target database may be configured to receive the instructions from the ML platform. The target database may be further configured to transmit a request to a cloud-based storage platform to add storage capacity to the target database. The target database may be further configured to increase the storage capacity by adding resources received from the cloud-based storage platform. This may preemptively prevent failure of the data stream at the load stage by increasing the target database's storage capacity.

The mainframe computer system may execute a first transform job in the transform phase. In some embodiments, when the behavior profile is determined to be adverse, the ML platform may be configured to issue instructions to the mainframe computer system to generate a second transform job to run in the transform phase.

Upon receipt of the instructions from the ML platform, the mainframe computer system may be configured to split the data received from the extract job into a first transform data stream and a second transform data stream. The ML platform may then process, in parallel, the first transform data stream using the first transform job and the second transform data stream using the second transform job. This may increase the capabilities of the mainframe computer system to process data being extracted from the source database by ETL process and preemptively prevent failure of the ETL process at the transform phase.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows illustrative apparatus and methods in accordance with the invention. In FIG. 1, an ETL Data Stream is shown moving through the illustrative apparatus. The ETL Data Stream may be an ETL process as described herein.

The apparatus may include Source Database 103, Mainframe 105, Target Database 107 and ML Platform 101. In the ETL Data Stream, data may be moved from Source Database 103 to Mainframe 105 via an Extract Job. Mainframe 105 may execute Job 1 and, in some embodiments, Job 2 on the ETL Data Stream. The execution of the jobs on the ETL Data Stream may represent the transform phase of the ETL Data Stream. It is to be understood that transform phase may include a mainframe executing one job, two jobs, three jobs, or any other suitable number of jobs on the ETL Data Stream.

After the transform phase, the data in the ETL Data Stream may be moved from Mainframe 105 to Target Database 107 in the load phase of the ETL Data Stream.

Sensors are illustrated recording properties of jobs executing the extract, transform and load phases. Sensor A is illustrated as recording properties of an extract job moving data from Source Database 103 to Mainframe 105. Sensor B is illustrated as recording properties of Job 1 executed by Mainframe 105. Sensor C is illustrated as recording properties of Job 2 executed by Mainframe 105. Sensor D is illustrated as recording properties of a load job that loads data from the ETL Data Stream from Mainframe 105 to Target Database 107.

Each of Sensors A, B, C and D may record one or more characteristics described herein, such as one or more of file size, table size, LAN speed, WAN speed, bandwidth, I/O exceptions, RAM, CPU, date/time complete or any other suitable characteristics. Alternately, each of Sensors A, B, C and D may record one of the aforementioned characteristics. Two or more additional sensors may be included to monitor characteristics of the extract, transform, and/or load phase, each of the additional sensors recording one of the aforementioned characteristics.

Each of Sensors A, B, C and D may record data points for the characteristic(s) being monitored. A data point may be recorded upon the lapse of a predetermined time interval such as, for example, ever 3 seconds, 10 seconds, 30 seconds, 1 minute, 5 minutes, 10 minutes, 30 minutes, 1 hour, 3 hours, or any other suitable time interval.

Each of Sensors A, B, C and D may be in electronic communication with ML Platform 101. The recorded data points may be transmitted to ML Platform 101 as soon as the data point is recorded. Alternately, data points may be transmitted to ML Platform 101 after a predetermined number of data points have been recorded.

ML Platform 101 may be in electronic communication with Source Database 103, Mainframe 105 and Target Database 107. ML Platform 101 may leverage the communication to pull database characteristics such as storage capabilities or any other suitable data. ML Platform 101 may transmit one or more remedial actions to one or more of Source Database 103, Mainframe 105 and/or Target Database 107 when a behavioral profile is determined to be adverse, as described herein.

Computer systems, platforms, and servers may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory. The source database may be part of a computer system. The target database may be part of a computer system.

Computer systems and servers may include RAM, ROM, an input/output ("I/O") module and a non-transitory or non-volatile memory. Machine-readable memory may be configured to store information in machine-readable data structures. The I/O module may include a microphone, button and/or touch screen which may accept user-provided input. The I/O module may include one or more of a speaker for providing audio output and a video display for providing textual, audiovisual and/or graphical output.

Software applications executed by the computer systems and servers may be stored within the non-transitory memory and/or other storage medium. Software applications may provide instructions to the processor that enable the computing system to perform various functions. The instructions may include any of the AI methods and processes described herein. For example, the non-transitory memory may store software applications such as an AI content controller, an operating system, tags, machine learning algorithms and an associated database. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

A computer system and server may be part of two or more networks. A computing system may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, a computer system and server may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, and antennas. Components of a computer system and server may be linked by a system bus, wirelessly or by other suitable interconnections. Components of a computer system and server may be present on one or more circuit boards. In some embodiments, the components may be integrated into a single chip. The chip may be silicon-based.

Figure 2:
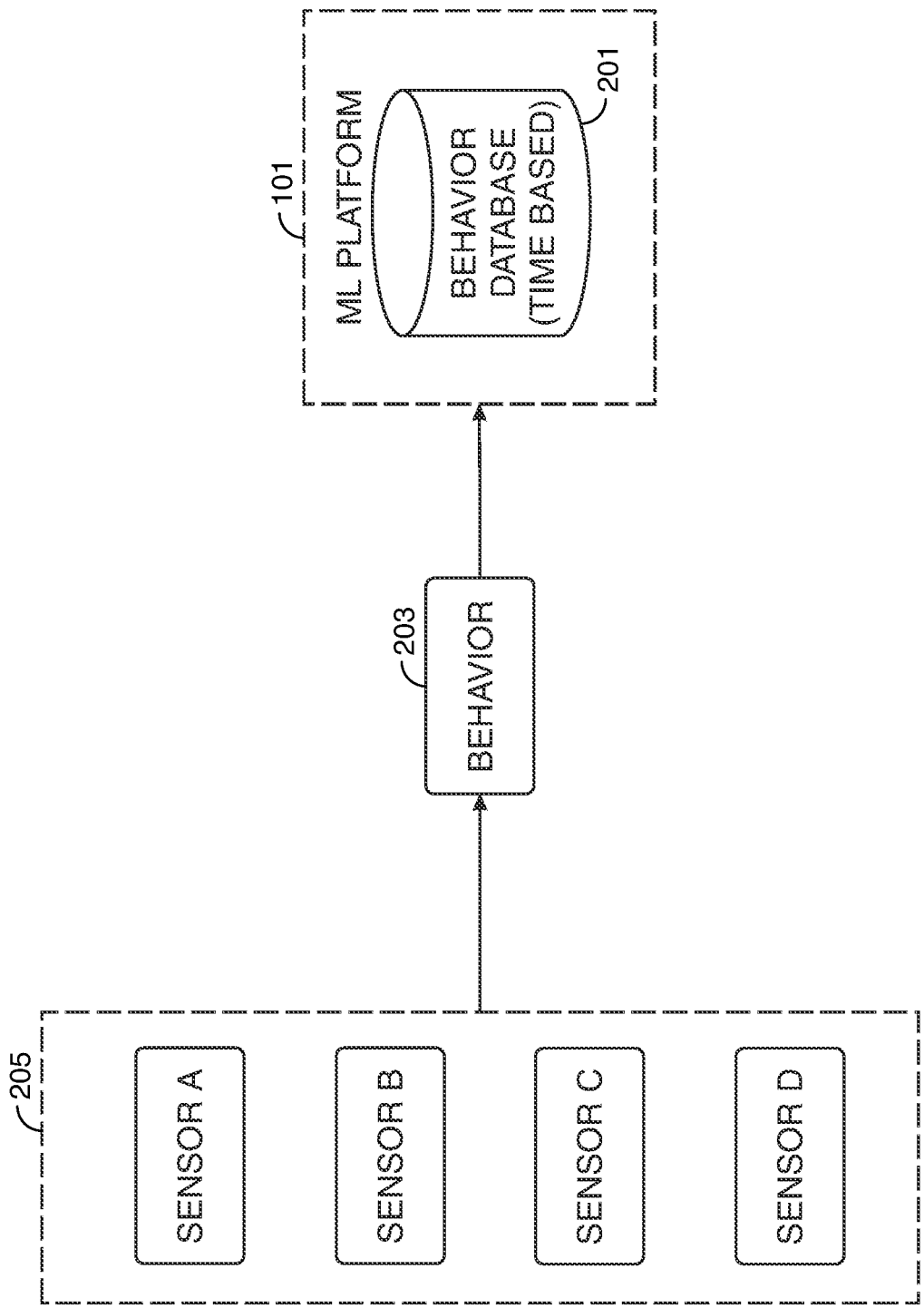
FIG. 2 shows illustrative apparatus and methods in accordance with the invention.

FIG. 2 shows illustrative apparatus and methods in accordance with the invention. In FIG. 2, Sensors 205 include Sensor A, Sensor B, Sensor C and Sensor D. In FIG. 2, Sensors 205 are illustrated feeding Behavior 203 to ML Platform 101. Behavior 203 may include the data points described herein. ML Platform 101 may store the received Behavior 302 in Behavior Database (Time Based) 201. ML Platform 101 may process the received Behavior 203 data as described herein and as illustrated in FIG. 3.

Figure 3:
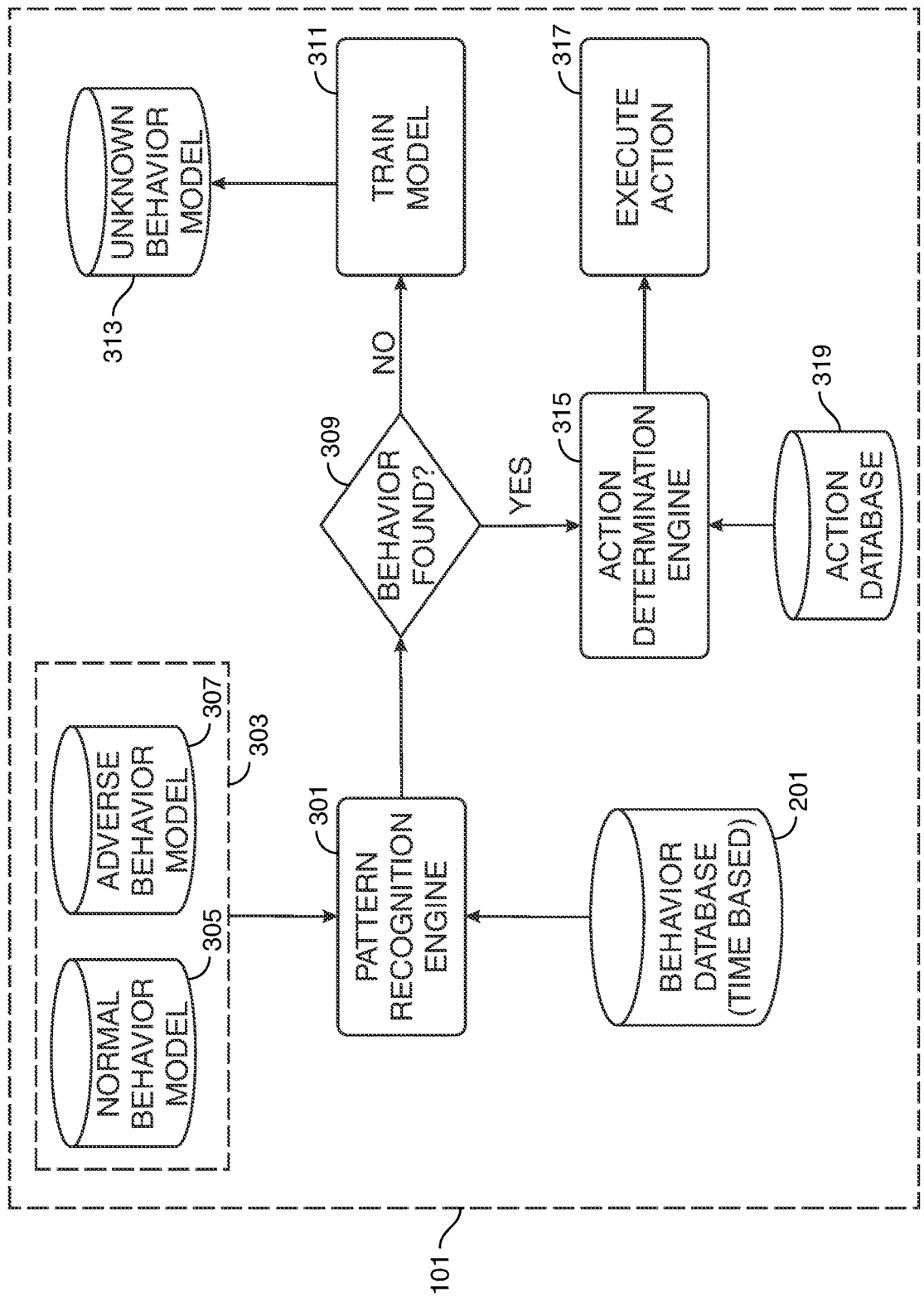
FIG. 3 shows illustrative apparatus and methods in accordance with the invention.

FIG. 3 shows illustrative apparatus and methods in accordance with the invention. FIG. 3 illustrates apparatus and methods included in, and performed by, ML Platform 101. Methods described as being performed in connection with FIG. 3 may alternately be described as being performed by ML Platform 101.

In FIG. 3, ML Platform 101 is shown including ML Models 303. ML Models 303 may include Normal Behavior Model 305 and Adverse Behavior Model 307. Normal Behavior Model 305 may store behavior profiles determined to be 'normal' as described herein. Adverse Behavior Model 307 may adverse behavior profiles determined to be 'adverse' as described herein.

Behavior Database 201 may be included in ML platform. Behavior Database 201 may feed the data points received from the sensors to Pattern Recognition Engine 301. For each sensor, Pattern Recognition Engine 301 may create a behavior profile for the data generated by the sensor. The behavior profile may be updated each time a new data point is received from the sensor. Pattern Recognition Engine 301 may compare the behavior profile to data stored in ML Models 303.

At step 309, Pattern Recognition engine may determine whether the behavior profile matches to a behavior profile stored in either Normal Behavior Model 305 or Adverse Behavior Model 307. The pattern recognition engine may use an AI Pattern Recognition algorithm. Using the algorithm, the system may use sensor data points collected by each sensor and perform a comparison. For each comparison, limits of deviations may be pre-set. Selected limits of deviations, either manually or by the ML platform, may indicate "sensitivity" levels of detection. For example, a software sensor monitoring incoming storage size may show an incoming data set of 21 GB. At the ML platform, a "Normal" Storage size detected by a sensor may average 20 GB. The deviation limit may be set to 3 GB, 2 GB, or 1 GB. When the deviation limit is 3 GB, this event will not trigger the remedial action. When the deviation limit is 1 GB, this event will trigger the remedial action.

If the behavior is not found, at step 311, the behavior profile may be used to train the ML Models 303. The training may include saving the behavior profile in Unknown Behavior Model 313 database. The training may include monitoring an ETL data flow from which the data points for the behavior profile were created. The training may include determine whether or not the ETL data flow generated one or more error messages. If not, the training may include saving the behavior profile in Normal Behavior Model 305. If the ETL data flow did generate one or more error messages, the training may include saving the behavior profile in Adverse Behavior Model 307.

If the behavior is found, Action Determination Engine 315 may pull an action from Action Database 319. The action may be pulled by feeding the behavior profile to Action Database 319. Action Database 319 may store a plurality of remedial actions. Each remedial action may be associated with specific characteristics of one or more predetermined sensor's behavior profiles. The specific characteristics of a behavior profiles may be referred to alternately here as 'match points.'

For example, the remedial action of increasing a target database's data storage may be associated with an increase greater than a predetermined amount recorded by a file size sensor monitoring the behavior of an extract job. The remedial action may also be associated with a file size value that, when exceeded, is considered adverse. The remedial action may also be associated with characteristics of behavior profiles captured by a table size sensor, a bandwidth sensor, or any other suitable sensor monitoring the extract job.

After the action is received from Action Database 319, the action may be executed at step 317.

Figure 4:
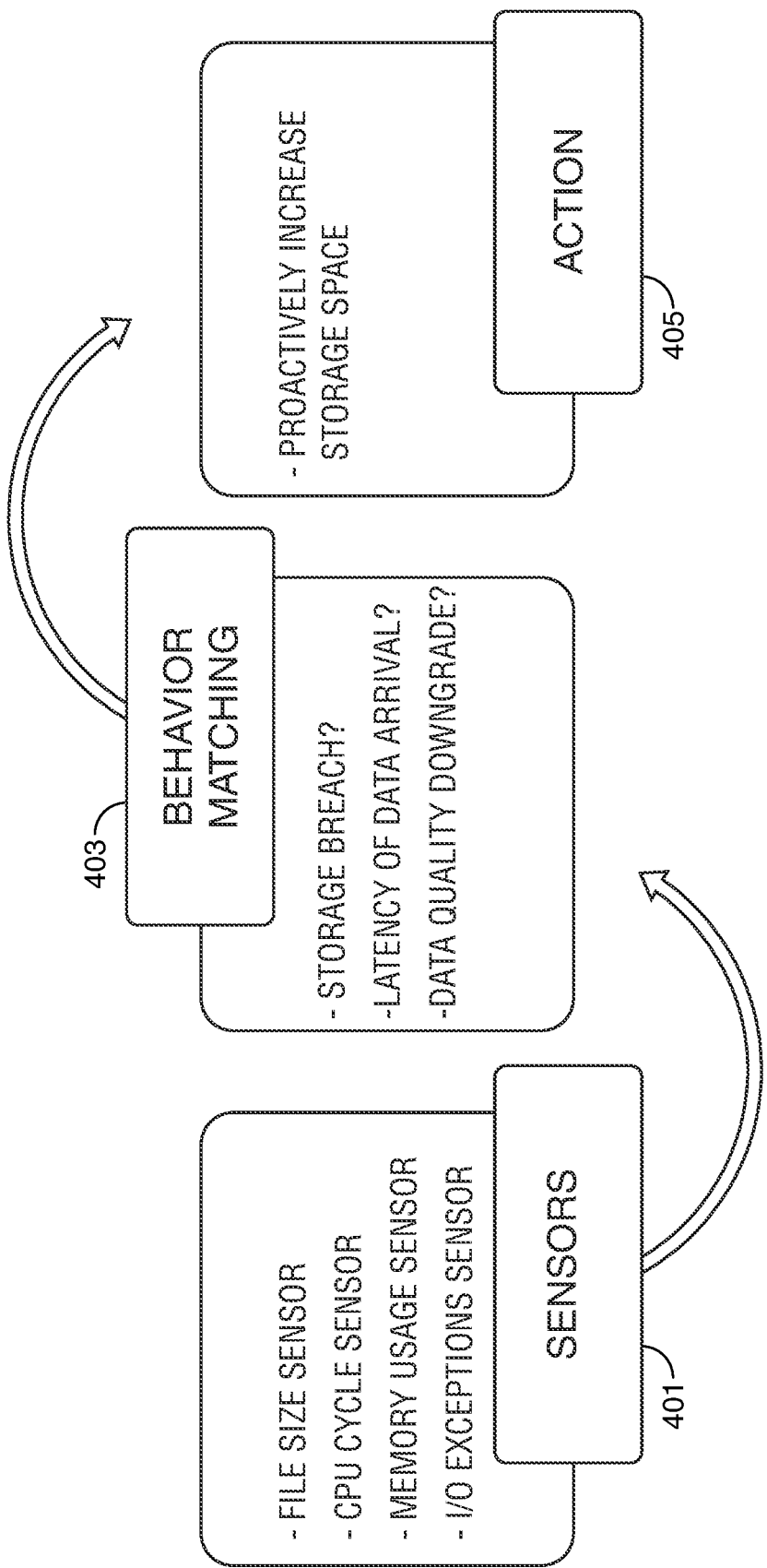
FIG. 4 shows illustrative methods in accordance with the invention.

FIG. 4 shows an illustrative method in accordance with the invention. At step 401, sensors gather data points over time. Exemplary sensors that may gather data points at step 401 may include file size sensor, CPU cycle sensor, memory usage sensor and I/O exceptions sensor.

At step 403, the ML platform may execute Behavior Matching processes. The Behavior Matching may include determining whether a data stream is/will experience a storage breach, a latency of data arrival and/or data quality downgrade.

At step 405, Action may be taken based on the results of the Behavior Matching performed at step 403. At Step 405, the action may include proactively increasing storage space. The storage space may be increased in one or more of the source database, the mainframe database and/or the target database.

Figure 5A:
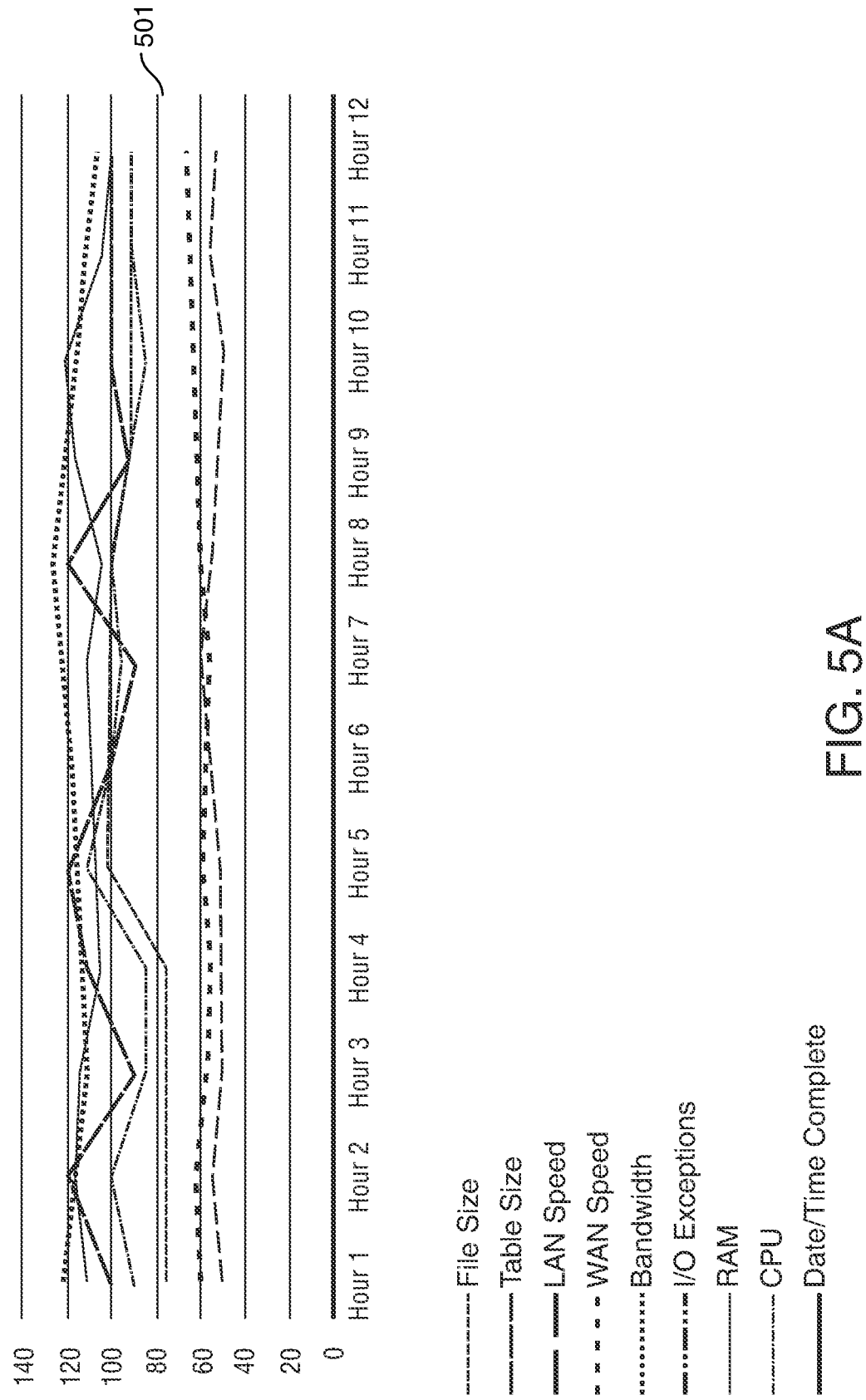
FIG. 5A shows illustrative behavioral profiles in accordance with the invention.
Figure 5B:
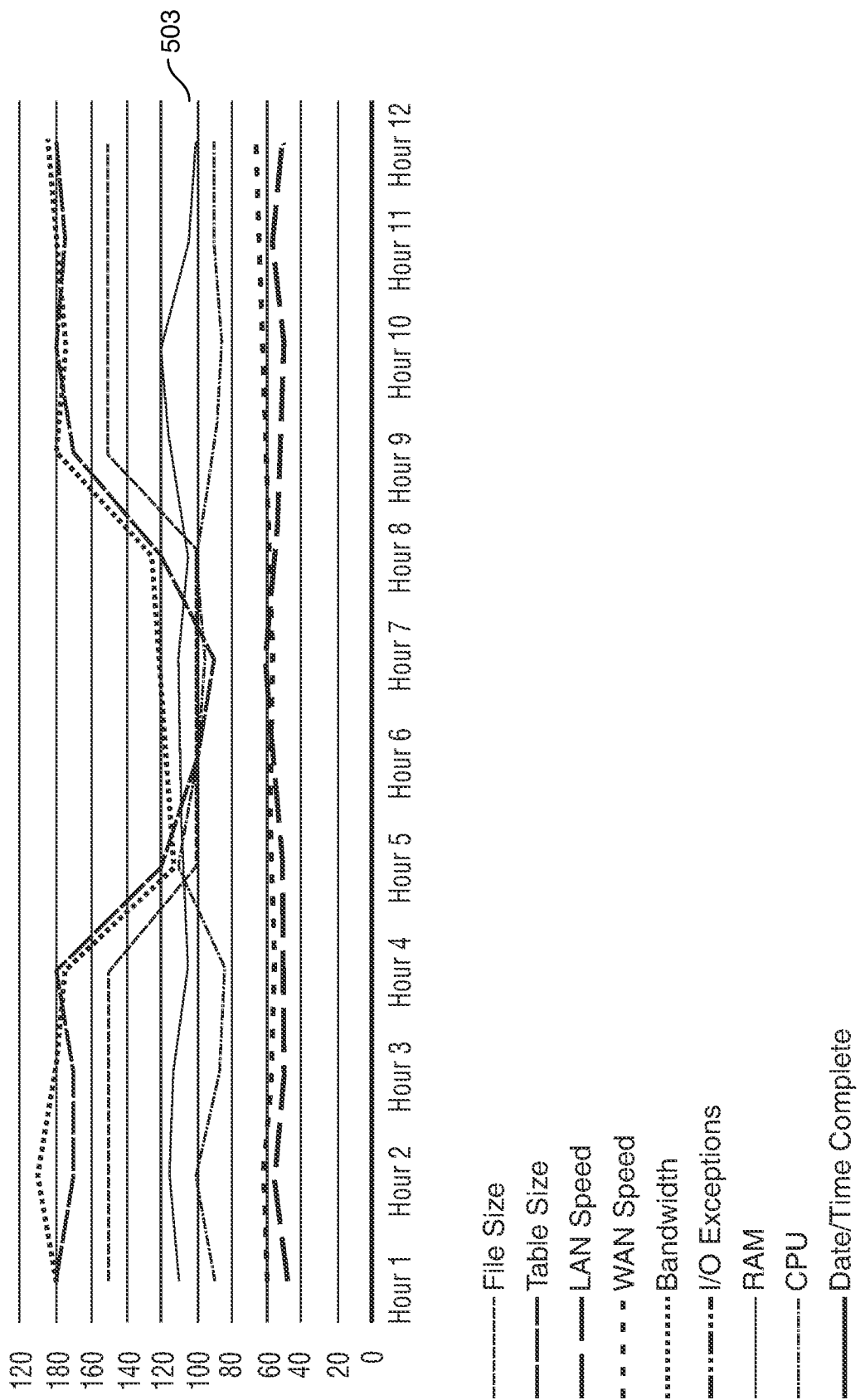
FIG. 5B shows illustrative behavioral profiles in accordance with the invention.

FIGS. 5A and 5B show illustrative behavior profiles in accordance with the invention. FIG. 5A illustrates illustrative Normal Behavior Profile 501. FIG. 5B illustrates illustrative Storage Breach Behavior Profile 503. Each behavior profile illustrated in FIGS. 5A and 5B includes a time-based graphical representation of data points captured by a sensor in accordance with the invention.

The behavior profiles illustrated in FIG. 5A include data generated by different sensors during a first ETL process. The behavior profiles illustrated in FIG. 5B include data generated by different sensors during a second ETL process. FIGS. 5A and 5B show exemplary combinations of data generated by different sensors for illustrative purposes. The X-Axis represents time. The Y-Axis does not represent a measurement since one set of illustrated data may have a unit of measurement different from a second set of illustrated data.

In each of Profiles 501 and 503, data points received from a plurality of software sensors are plotted over time. The data points include file size, table size, LAN speed, WAN speed, Bandwidth, I/O Exceptions, RAM, CPU, Date/Time completion.

Each of the data points may be captured by a corresponding sensor. For example, file size may be captured by a file size sensor, table size may be captured by the table size sensor, LAN speed may be captured by a LAN speed sensor, WAN speed may be captured by a WAN speed sensor, Bandwidth may be captured by a Bandwidth sensor, I/O Exceptions may be captured by an I/O Exceptions sensor, RAM may be captured by a RAM sensor, CPU may be captured by a CPU sensor, and Date/Time completion may be captured by a Date/Time completion sensor.

Normal Storage Behavior Profile 501 illustrates behavior profiles for the sensors that have been classified as 'Normal' by the ML platform. In some embodiments, each of the illustrated behavior profiles in FIG. 5A may represent a ML normal behavior profile for the corresponding sensor.

Storage Breach Behavior Profile 503 illustrates normal behavior profiles for all the sensors except for the file size sensor, table size sensor and the bandwidth sensor. Behavior profiles created based on data points received from the file size sensor, table size sensor, and bandwidth sensor have been classified as 'Adverse' by the ML platform during both early on in the ETL process, and later on in the ETL process. These profiles have been classified as 'Adverse' at least because of an increased file, table and bandwidth size of the data stream during these time periods relative to the normal behavior profiles illustrated in FIG. 5A. Classifying the behavior profiles generated by one or more of the file size sensor, table size sensor and/or the bandwidth sensor as 'Adverse' may trigger one or more remedial actions described herein.

Figure 6A:
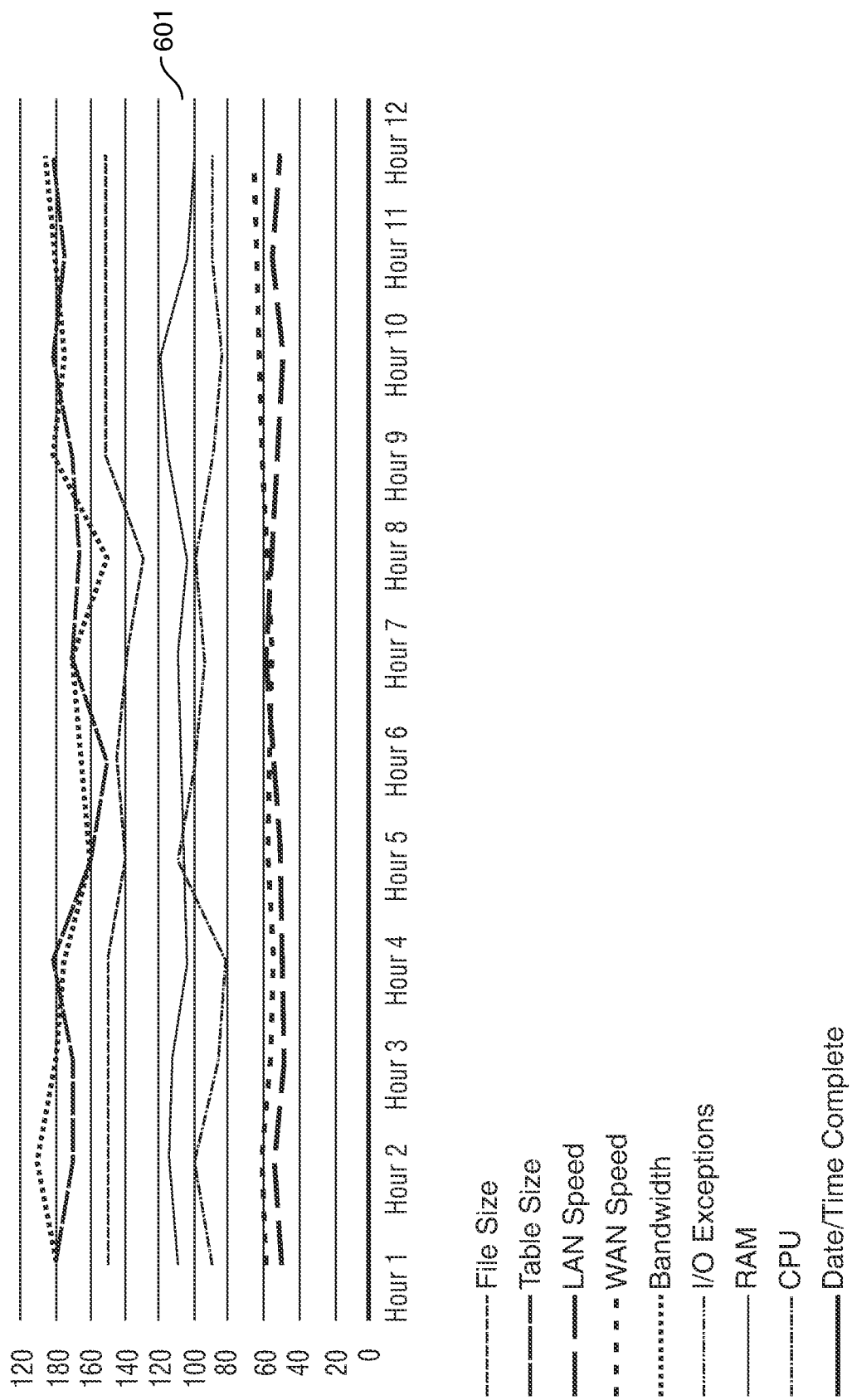
FIG. 6A shows illustrative behavioral profiles in accordance with the invention.
Figure 6B:
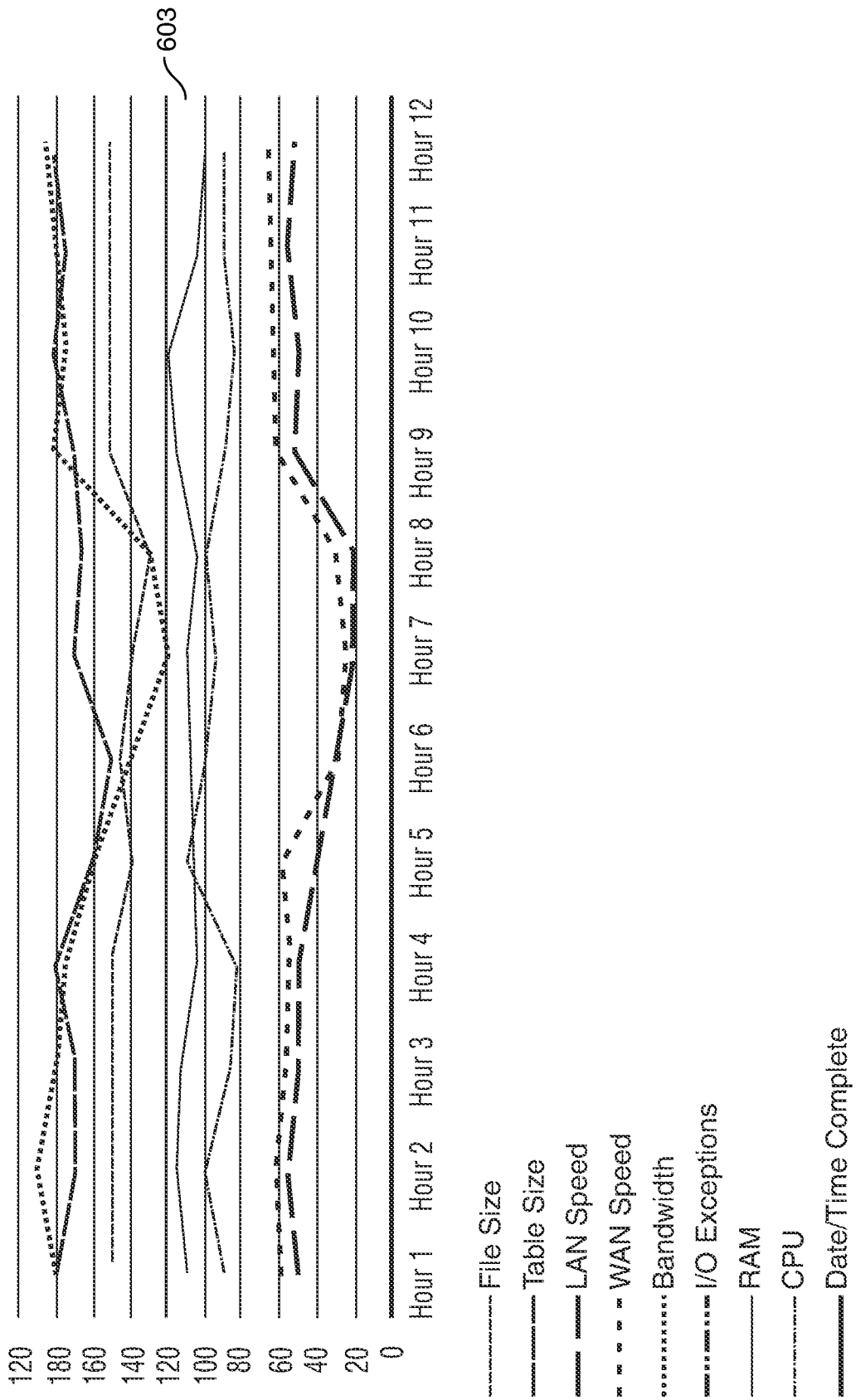
FIG. 6B shows illustrative behavioral profiles in accordance with the invention.

FIGS. 6A and 6B show illustrative behavior profiles in accordance with the invention. FIG. 6A illustrates illustrative Normal Network Speed Behavior Profile 601. FIG. 6B illustrates illustrative Network Latency Behavior Profile 603. Each behavior profile illustrated in FIGS. 6A and 6B includes a time-based graphical representation of data points captured by a sensor in accordance with the invention.

The behavior profiles illustrated in FIG. 6A include data generated by different sensors during a first ETL process. The behavior profiles illustrated in FIG. 6B include data generated by different sensors during a second ETL process. FIGS. 6A and 6B show exemplary combinations of data generated by different sensors for illustrative purposes. The X-Axis represents time. The Y-Axis does not represent a measurement since one set of illustrated data may have a unit of measurement different from a second set of illustrated data.

In each of Profiles 601 and 603, data points received from a plurality of software sensors are plotted over time. The data points include file size, table size, LAN speed, WAN speed, Bandwidth, I/O Exceptions, RAM, CPU, Date/Time completion.

Normal Network Speed Behavior Profile 601 illustrates behavior profiles for the sensors that have been classified as 'Normal' by the ML platform. In some embodiments, each of the illustrated behavior profiles in FIG. 6A may represent a ML normal behavior profile for the corresponding sensor.

Network Latency Behavior Profile 603 illustrates normal behavior profiles for all the sensors except for the LAN speed sensor and the WAN speed sensor. Behavior profiles created based on data points received from the LAN speed sensor and the WAN speed sensor have been classified as 'Adverse' by the ML platform during the middle of the deployment of the ETL process. These profiles have classified as 'Adverse' at least because of a decreased data transfer speed in both the LAN and WAN networks for the data stream during these time periods relative to the normal profiles illustrated in FIG. 6A. Classifying the behavior profiles generated by one or more of the WAN sensor and/or the LAN sensor as 'Adverse' may trigger one or more remedial actions described herein.

Thus, systems and methods for reducing failure in an information flow of an ETL data stream are provided. Persons skilled in the art will appreciate that the present invention can be practiced by other than the described embodiments, which are presented for purposes of illustration rather than of limitation.

What is claimed is:

1. An artificial intelligence ("AI") method of reducing failure in an informational flow of a data stream controlled by an Extract Transform Load ("ETL") process, the AI method using a machine learning ("ML") model training system, the ETL process including an extract phase, the extract phase followed by a transform phase and the transform phase followed by a load phase, the load phase including loading data into a target database, the AI method comprising:

deploying a software sensor that periodically captures data points for an extract job executed during the extract phase of the ETL process, each data point capturing a file size of data being extracted from a source database at a time and the time;

receiving the data points from the software sensor;

building a behavior profile concurrently with the receiving of the data points, the behavior profile including a time-based graphical representation of the data points;

extracting from a ML database built by the ML model training system a ML normal behavior profile tagged with a target database identifier which identifies the target database; and when the behavior profile includes a characteristic deviating from a ML normal behavior profile characteristic by more than a predetermined amount:
  instructing the target database to increase a storage capacity of the target database by acquiring additional cloud-based storage resources, thereby pre-emptively preventing failure of the data stream at the load phase by increasing the storage capacity of the target database;
wherein:
  the instructing is executed prior to a failure of the ETL process at the load phase; and
  the building the behavior profile is terminated when the extract job has completed extracting a predetermined percentage of a total number of files which the extract job is programmed to extract.

2. The AI method of claim 1 wherein the deploying of the software sensor comprises running a shell script in the source database together with the extract job, the extract job extracting data from the source database.

3. The AI method of claim 1 wherein the deploying the software sensor comprises running a shell script in a mainframe computer system, the mainframe computer system:
  receiving data extracted from the source database by the extract job; and
  executing one or more jobs during the transform phase.

4. The AI method of claim 1 wherein the software sensor:
  captures a first data point at a first time; and
  captures a second data point at a second time after a lapse of a predetermined time interval from the first time.

5. The AI method of claim 1, when the behavior profile is determined to include the characteristic deviating from the ML normal behavior profile characteristic by more than the predetermined amount, further comprising:
  adding the behavior profile to an Adverse Behavior Model database.

6. The AI method of claim 5, when the behavior profile is determined to include the characteristic deviating from the ML normal behavior profile characteristic by more than the predetermined amount, further comprising:
  issuing instructions to a mainframe computer system, the mainframe computer system executing a first transform job during the transform phase, to generate a second transform job to run in the transform phase, thereby increasing capabilities of the mainframe computer system to process data being extracted from the source database by the ETL process, thereby preemptively preventing failure of the ETL process at the transform phase.

7. The AI method of claim 6, wherein the second transform job executes a script identical to the first transform job, the AI method further comprising:
  issuing instructions to the mainframe computer system to split data received from the extract job into a first transform data stream and a second transform data stream, and to process, in parallel, the first transform data stream using the first transform job and the second transform data stream using the second transform job.

8. The AI method of claim 1 further comprising initiating a ML phase that loads training behavior profiles into an Adverse Behavior Model database and a Normal Behavior Model database, each training behavior profile being generated for one of a plurality of training ETL processes during an extract phase of a training ETL process, the ML phase comprising:
  deploying the software sensor that periodically captures training data points for each of the plurality of training ETL processes, each training data point capturing a file size of data being extracted, by the training ETL process, from the source database at a time and the time;
  receiving the training data points from the software sensor;
  for each of the plurality of training ETL processes, creating a training behavior profile, the training behavior profile including a graphical representation of the training data points generated by the software sensor for the training ETL process;
  upon completion of each training ETL process, determining if the training ETL process generated one or more failure messages during one or more of the extra phase, transform phase and load phase;
  for each training ETL process that generated one or more failure messages:
    saving a corresponding training behavior profile in the Adverse Behavior Model database; and
    tagging the training behavior profile with an identifier identifying a target database into which the training ETL process loads data at the load phase; and
  for each ETL process that did not generate a failure message:
    saving a corresponding training behavior profile in the Normal Behavior Model database; and
    tagging the training behavior profile with an identifier identifying a target database into which the training ETL process loads data at the load phase.

9. The AI method of claim 8 wherein the failure messages are failure messages generated during the transform phase and the load phase of the training ETL processes.

10. The AI method of claim 8 further comprising:
  grouping the training behavior profiles in the Normal Behavior Model database into groups, each group including training behavior profiles associated with one of the identifiers;
  for each group:
    building a ML normal behavior profile; and
    tagging the ML normal behavior profile with the identifier associated with the group.

11. An artificial intelligence ("AI") method of reducing failure in an informational flow of a data stream controlled by an Extract Transform Load ("ETL") process, the AI method using a machine learning ("ML") model training system, the ETL process including an extract phase, the extract phase followed by a transform phase and the transform phase followed by a load phase, the AI method comprising:
  deploying a first software sensor that periodically captures first data points for an extract job executed during the extract phase, each first data point capturing a file size of data being extracted from a source database by the extract job at a time and the time;
  deploying a second software sensor that periodically captures second data points for the extract job, each second data point capturing a table size of files being extracted from the source database at a time and the time;
  deploying a third software sensor that periodically captures third data points for the extract job, each third data point capturing a bandwidth of a data connection between the source database and a mainframe computer system at a time and the time, the extract job transferring the data extracted from the source database to the mainframe computer system;

receiving the first data points from the first software sensor, the second data points from the second software sensor, and the third data points from the third software sensor;

building a first behavior profile concurrently with the receiving of the first data points, building a second behavior profile concurrently with the receiving of the second data points, and building a third behavior profile concurrently with the receiving of the third data points;

comparing the first behavior profile to first behavior profiles stored in an Adverse Behavior Model database and first behavior profiles stored in a Normal Behavior Model database, comparing the second behavior profile to second behavior profiles stored in the Adverse Behavior Model database and second behavior profile stored in the Normal Behavior Model database, and comparing the third behavior profile to third behavior profiles stored in the Adverse Behavior Model database and third behavior profiles stored in the Normal Behavior Model database; and when at least two of the first behavior profile, second behavior profile and third behavior profile are determined to have a threshold number of match points matching to profiles stored in the Adverse Behavior Model database:

identifying a target database into which the ETL process loads data during the load phase; and instructing the target database to increase a storage capacity of the target database by acquiring additional cloud-based storage resources, thereby preemptively preventing failure of the data stream at the load phase by increasing the storage capacity of the target database.

12. The AI method of claim 11 wherein the deploying the first software sensor comprises running a first shell script together with the extract job, deploying the second software sensor comprises running a second shell script together with the extract job and deploying the third software sensor comprising running a third shell script together with the extract job.

13. The AI method of claim 11 wherein the deploying the first software sensor, the second software sensor and the third software sensor comprises running a first shell script, a second shell script and a third shell script in a mainframe computer system, the mainframe computer system:

receiving data extracted from the source database by the extract job; and executing one or more jobs during the transform phase.

14. The AI method of claim 11 wherein the first software sensor:

captures a first data point at a first time; and captures a second data point at a second time after a lapse of a predetermined time interval from the first time.

15. The AI method of claim 11 wherein the building of the first behavior profile, the second behavior profile and the third behavior profile is terminated when the extract job has completed extracting a predetermined percentage of a total number of files which the extract job is programmed to extract.

16. The AI method of claim 11, when two of the first behavior profile, second behavior profile and third behavior profile are determined to have a threshold number of match points matching to profiles stored in the Adverse Behavior Model database, further comprising:

adding the first behavior profile, the second behavior profile and the third behavior profile to the Adverse Behavior Model database.

17. An artificial intelligence ("AI") method of reducing failure in an informational flow of a data stream controlled by an Extract Transform Load ("ETL") process, the AI method using a machine learning ("ML") model training system, the ETL process including an extract phase, the extract phase followed by a transform phase and the transform phase followed by a load phase, the load phase including loading data into a target database, the AI method comprising:

deploying a software sensor that periodically captures data points for an extract job executed during the extract phase of the ETL process, each data point capturing a file size of data being extracted from a source database at a time and the time;

receiving the data points from the software sensor;

building a behavior profile concurrently with the receiving of the data points, the behavior profile including a time-based graphical representation of the data points;

extracting from a ML database built by the ML model training system a ML normal behavior profile tagged with a target database identifier which identifies the target database; and when the behavior profile includes a characteristic deviating from a ML normal behavior profile characteristic by more than a predetermined amount:

instructing the target database to increase a storage capacity of the target database by acquiring additional cloud-based storage resources, thereby preemptively preventing failure of the data stream at the load phase by increasing the storage capacity of the target database;

wherein:

the instructing is executed prior to a failure of the ETL process at the load phase; and the deploying of the software sensor comprises running a shell script in the source database together with the extract job, the extract job extracting data from the source database.

* * * * *